(12) United States Patent
Maria Barlag et al.

(10) Patent No.: US 7,963,650 B2
(45) Date of Patent: Jun. 21, 2011

(54) EYEWEAR WITH WIRE FRAME THREADED THROUGH LENSES

(75) Inventors: Gabriel Matheus Maria Barlag, Amsterdam (NL); Marcellinus Gerardus Maria Barlag, Amsterdam (NL); Ira S. Lerner, Marina Del Ray, CA (US)

(73) Assignee: ISL Technologies, LLC, Brooklyn, NY (US)

( * ) Notice: Subject to any disclaimer, the term of this patent is extended or adjusted under 35 U.S.C. 154(b) by 0 days.

(21) Appl. No.: 12/701,091

(22) Filed: Feb. 5, 2010

(65) Prior Publication Data

US 2010/0231849 A1    Sep. 16, 2010

Related U.S. Application Data

(60) Provisional application No. 61/150,452, filed on Feb. 6, 2009.

(51) Int. Cl.
*G02C 1/04* (2006.01)
(52) U.S. Cl. ............ 351/106; 351/83; 351/86; 351/103
(58) Field of Classification Search .................. 351/110, 351/108, 109, 106, 103, 111, 41, 158, 83, 351/86; 2/447, 10, 13, 431, 439
See application file for complete search history.

(56) References Cited

U.S. PATENT DOCUMENTS

| | | | | |
|---|---|---|---|---|
| 3,233,249 | A * | 2/1966 | Baratelli et al. | 2/443 |
| 5,297,298 | A * | 3/1994 | Salatka et al. | 2/447 |
| 5,367,344 | A * | 11/1994 | Fuchs | 351/41 |
| 5,471,257 | A * | 11/1995 | Houmand | 351/86 |
| 5,748,280 | A | 5/1998 | Herman | |
| 6,334,679 | B2 * | 1/2002 | Masunaga et al. | 351/110 |
| 6,644,805 | B2 * | 11/2003 | Nakamura | 351/103 |
| 7,044,596 | B2 * | 5/2006 | Park | 351/103 |
| 7,207,672 | B2 * | 4/2007 | Lee | 351/103 |
| 7,329,000 | B2 * | 2/2008 | Actis-Datta | 351/86 |
| 2006/0139566 | A1 | 6/2006 | Actis-Datta | |

FOREIGN PATENT DOCUMENTS

DE    298 23 238 U1    2/1999
GB    435 105 A    9/1935

OTHER PUBLICATIONS

International Search Report and Written Opinion; International App. No. PCT/US2010/023313; dated Apr. 13, 2010; 9 pages.

* cited by examiner

*Primary Examiner* — Hung X Dang
(74) *Attorney, Agent, or Firm* — Knobbe, Martens, Olson & Bear, LLP

(57) ABSTRACT

A rimless eyeglass assembly is constructed using a first lens and a second lens with holes for receiving a wire. A wire having a first end and a second end is threaded through the holes of the first and second lens to form eyewear, in some cases including a bridge portion and temples.

15 Claims, 16 Drawing Sheets

US 7,963,650 B2

EYEWEAR WITH WIRE FRAME THREADED THROUGH LENSES

RELATED APPLICATIONS

The present application claims the priority benefit under 35 U.S.C. §119(e) of U.S. Provisional Patent Application No. 61/150,452, filed Feb. 6, 2009, which is hereby incorporated by reference in its entirety. The present application also incorporates by reference in its entirety U.S. Provisional Patent Application No. 61/150,539, filed on Feb. 6, 2009 and U.S. application Ser. No. 12/701,123, filed concurrently with the present application, entitled EYEWEAR WITH WIRE FRAME INSERTED INTO SLOTS IN. LENSES.

BACKGROUND OF THE INVENTION

1. Field of the Invention

The present invention generally relates to eyewear. More particularly, the present invention relates to eyewear in which a wire frame is threaded through holes provided in the lenses.

2. Description of the Related Art

In recent years, eyewear that has no frame around the lenses, commonly referred to as rimless eyewear, has become popular with the eyeglass wearing public because it is cosmetically flattering in appearance on the wearer's face and often lightweight and comfortable as well. Such rimless eyewear is popular for both sunglasses and prescription eyewear.

Traditionally, rimless eyeglasses have been formed by drilling holes or notches into the eyeglass lenses and using threaded fasteners or screws to attach the ear stems (also called "temples") and bridge to the left and right lenses. Alternatively, plastic plugs that fit into rigid pins by press-fit means or compression have been used to connect the temples and bridge members to the lenses. This method is commonly referred to in the industry as a "compression mounting system" or a "compression mount". As a further alternative, some methods of construction have used chemical bonding, fusing, glue and other adhesive methods to attach the temples and bridge to the lenses.

Although rimless eyewear is popular, the threaded fasteners or screws used to attach the temples and bridge in rimless eyewear often disadvantageously loosen over time, requiring constant maintenance, tightening and adjustment. Compression mounting systems used in rimless eyewear also disadvantageously loosen over time, often requiring a skilled technician to tighten or replace the components. In addition, rimless mounting systems that use chemical bonding, glue and other adhesives, can be disadvantageously time consuming and costly to make, often requiring expensive and specialized equipment as part of the manufacturing process.

SUMMARY OF THE INVENTION

Accordingly, a lightweight eyewear assembly is desired wherein the lenses are not solely connected to the frame components by threaded members or compression mounts.

In some embodiments that are arranged and configured in accordance with certain features, aspects and advantages of the present invention, eyewear comprises a first lens, a second lens and a frame connecting the first lens to the second lens. The first and second lenses are generally rigid. The frame comprises a wire. In some embodiments, the wire has at least a portion that is less rigid than the first and second lenses. The first lens comprises a first hole and a second hole that are spaced apart in a first lens width direction. The second lens comprises a third hole and a fourth hole spaced that are apart in a second lens width direction. The wire extends through the first hole of the first lens and the fourth hole of the second lens.

In some embodiments that are arranged and configured in accordance with certain features, aspects and advantages of the present invention, a method is provided for making eyewear comprising forming holes in a pair of lenses and threading a wire through the holes to secure the lenses together while also providing temples or an attachment location for temples.

In some embodiments that are arranged and configured in accordance with certain features, aspects and advantages of the present invention, eyewear comprises a first lens and a second lens. The first lens comprises a first hole and a second hole and the second lens comprises a third hole and a fourth hole. A wire extends through the first hole, the second hole, the third hole and the fourth hole such that the wire secures the lenses together and such that a first end of the wire and a second end of the wire extend rearward from the lenses.

BRIEF DESCRIPTION OF THE DRAWINGS

These and other features, aspects and advantages of the present invention will now be described with reference to the drawings of several preferred embodiments, which embodiments are intended to illustrate and not to limit the invention. In the drawings.

DETAILED DESCRIPTION OF THE PREFERRED EMBODIMENT

Figure 1:
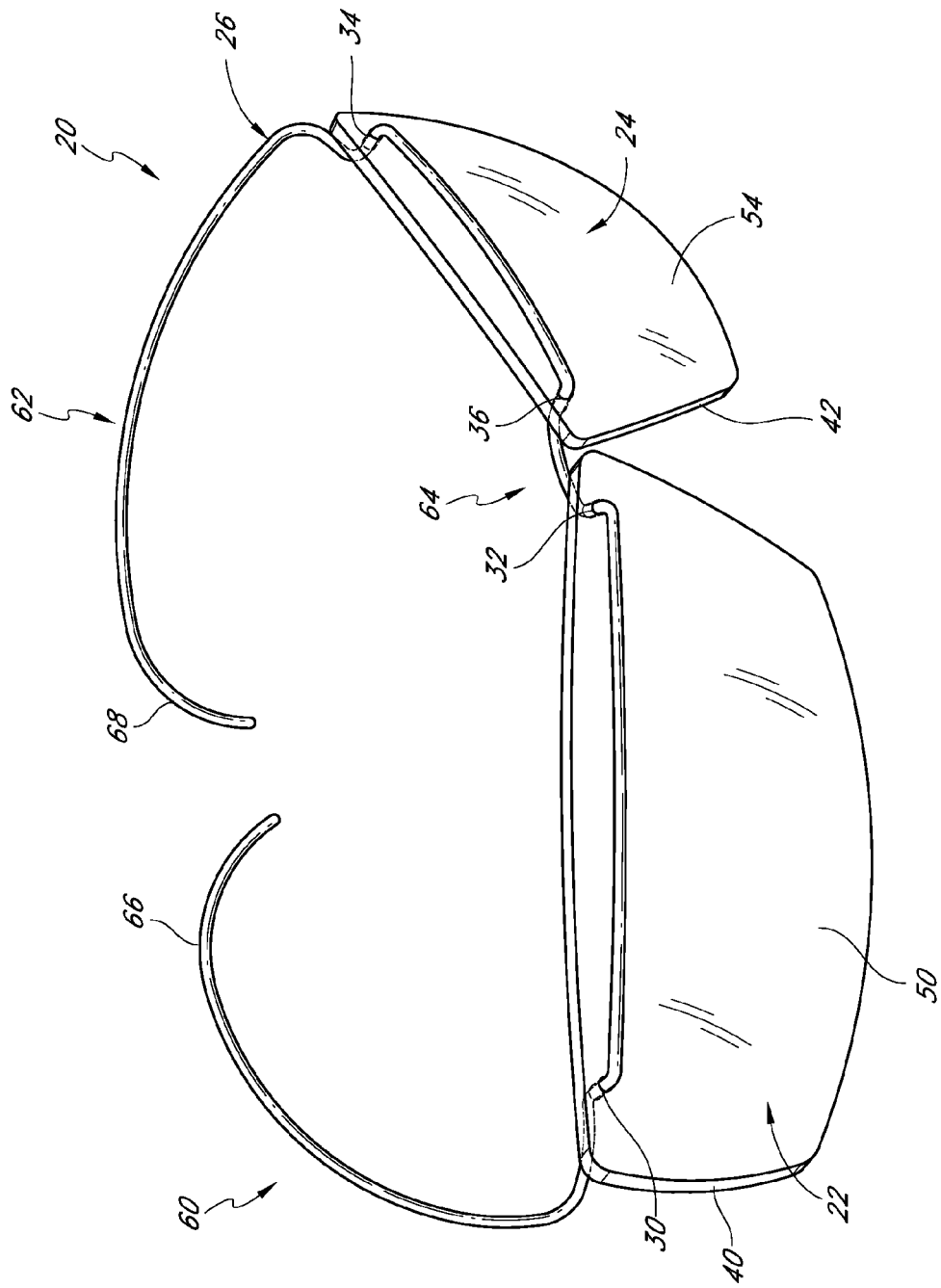
FIG. 1 is a perspective view showing eyewear that is arranged and configured in accordance with certain features, aspects and advantages of an embodiment of the present invention.

With reference initially to FIG. 1, eyewear 20 arranged and configured in accordance with an embodiment of the present invention comprises a first lens 22, a second lens 24 and a frame 26. The eyewear 20 features a very sleek and modern appearance while also having very few components, which improves the reliability of the eyewear and significantly reduces the weight of the eyewear.

The lenses 22, 24 can have any suitable configuration. Preferably, the lenses 22, 24 are substantially rigid. More preferably, the lenses 22, 24 are more rigid and/or less flexible than the frame 26 such that the frame 26 cannot cause the lenses 22, 24 to bend substantially or in a manner that would cause difficulties with prescription lenses. In some configurations, the lenses 22, 24 are constructed to be shatter-resistant. The lenses 22, 24 can be configured for various vision correcting purposes, for purposes such as glare reduction, magnification, protection from UV rays, lighter weights, as well as for aesthetic reasons such as thinness of the lenses, tints and coloring of the lenses.

The first lens 22 preferably comprises a first hole 30 and a second hole 32 that are spaced apart in a lens width direction. Preferably, the first and second holes 30, 32 of the first lens 22 are spaced apart by more than half of the total dimension of the full lens width. In the illustrated configuration, the first hole 30 is proximate a temple side of the first lens 22 while the second hole 32 is proximate a nasal side of the first lens 22. Similarly, the second lens 24 comprises a first hole 34 and a second hole 36, wherein the first hole 34 is proximate a temple side of the second lens 24 and the second hole 36 is proximate a nasal side of the second lens 24. The first and second holes 34, 36 of the second lens 24 preferably are similarly spaced as the first and second holes 30, 32 of the first lens 22. Symmetry is preferred by not necessary. Asymmetric hole placement can provide for different aesthetic appearances.

The first lens 22 comprises at least one outer peripheral surface 40 and the second lens 24 comprises at least one outer peripheral surface 42. The at least one outer peripheral surfaces 40, 42 preferably defines a closed outer boundary of the respective lens 22, 24. The first holes 30, 34 and the second holes 32, 36 preferably are spaced inward of the outer peripheral surfaces 40, 42. More preferably, the first and second holes 30, 32 do not intersect with the outer peripheral surface 40 and the first and second holes 34, 36 do not intersect with the outer peripheral surface 42. In one application, at least one of the first and second holes 30, 32 does not intersect with the outer peripheral surface 40 and at least one of the first and second holes 34, 36 does not intersect with the outer peripheral surface 42. Preferably, at least the first hole of the first lens and the second hole of the second lens are defined by closed shapes (e.g., circle, square, oval, and rectangle). More preferably, the holes 30, 32, 34, 36 all are defined by closed shapes.

With reference to FIG. 1, the frame 26 preferably comprises a wire 44 that extends through one or more of the first and second holes 30, 32, 34, 36. The wire can have any suitable construction. In some applications, the wire 44 may be a mono filament wire or the wire 44 may be a multifilament or braided wire. In some applications, the wire 44 can be made of a metallic material, including metal alloys, a natural material or a synthetic material, such as nylon, for example without limitation. In some applications, the wire 44 may be encased, encapsulated, or coated, such as where the wire 44 is encased in a rubber or plastic sleeve. In some embodiments, the wire 44 can be partially or fully encased, wrapped, covered and/or braided for decorative reasons and/or for added strength and durability of the eyewear 20. For instance, the encasement, wrapping, covering and/or braiding can increase a frictional interface between the wire 44 and the associated lens or lenses 22, 24, which helps reduce the likelihood of the lens or lenses 22, 24 shifting relative to the wire 44 over time. In a preferred configuration, the wire 44 can be bent and assumes the bent shape. In other words, the wire 44 yields when bent rather than restores to its original shape when released. The bending of the wire 44 assists in locking the lenses 22, 24 in position relative to the frame 26.

Figure 4:
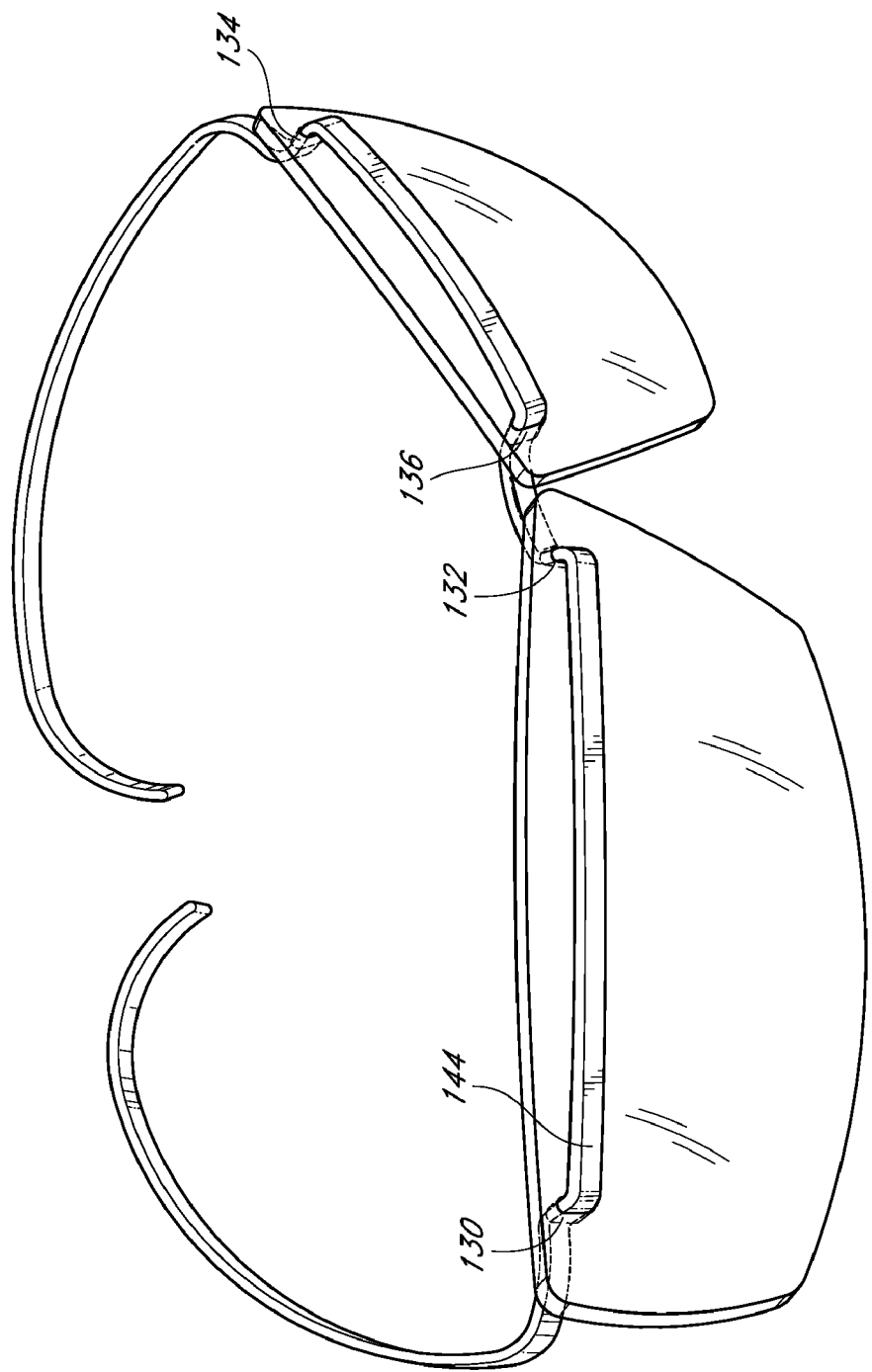
FIG. 4 is a perspective view showing eyewear that is arranged and configured in accordance with certain features, aspects and advantages of another embodiment of the present invention.

The wire 44 can have any suitable shape. For example, the wire 44 can have a regular or an irregular cross-section. In other words, the cross-sectional shape can be constant or can vary over its length. In some embodiments, the wire 344 has a substantially constant cross-section that is round, oval, rectangular, square or generally flat. For example, as shown in FIG. 4, a wire 144 can comprise a generally flattened shape. Other shapes also can be used. In certain preferred embodiments, a series of holes 130, 132, 134, 136 can be shaped to generally correspond to the cross-sectional shape of the wire 144. The shaped holes 130, 132, 134, 136 (e.g., square or rectangular) can be formed using laser cutting machinery or the like. As shown in FIG. 4, where the flattened wire 144 is used, the series of holes 130, 132, 134, 136 can be formed having a shape and size the corresponds to the flattened wire 144. Other configurations are possible.

With reference again to FIG. 1, the wire 44 also can have any suitable size. In the embodiment shown in FIG. 1, the wire 44 is substantially cylindrical and the wire 44 has a diameter of between about 0.7 millimeters and about 3.0 millimeters. In one embodiment, the wire 44 has a diameter of about 0.7 millimeters. In another embodiment, the wire 44 has a diameter of about 0.35 millimeters. In yet another embodiment, the wire 44 has a diameter of about 3.0 millimeters.

Figure 2:
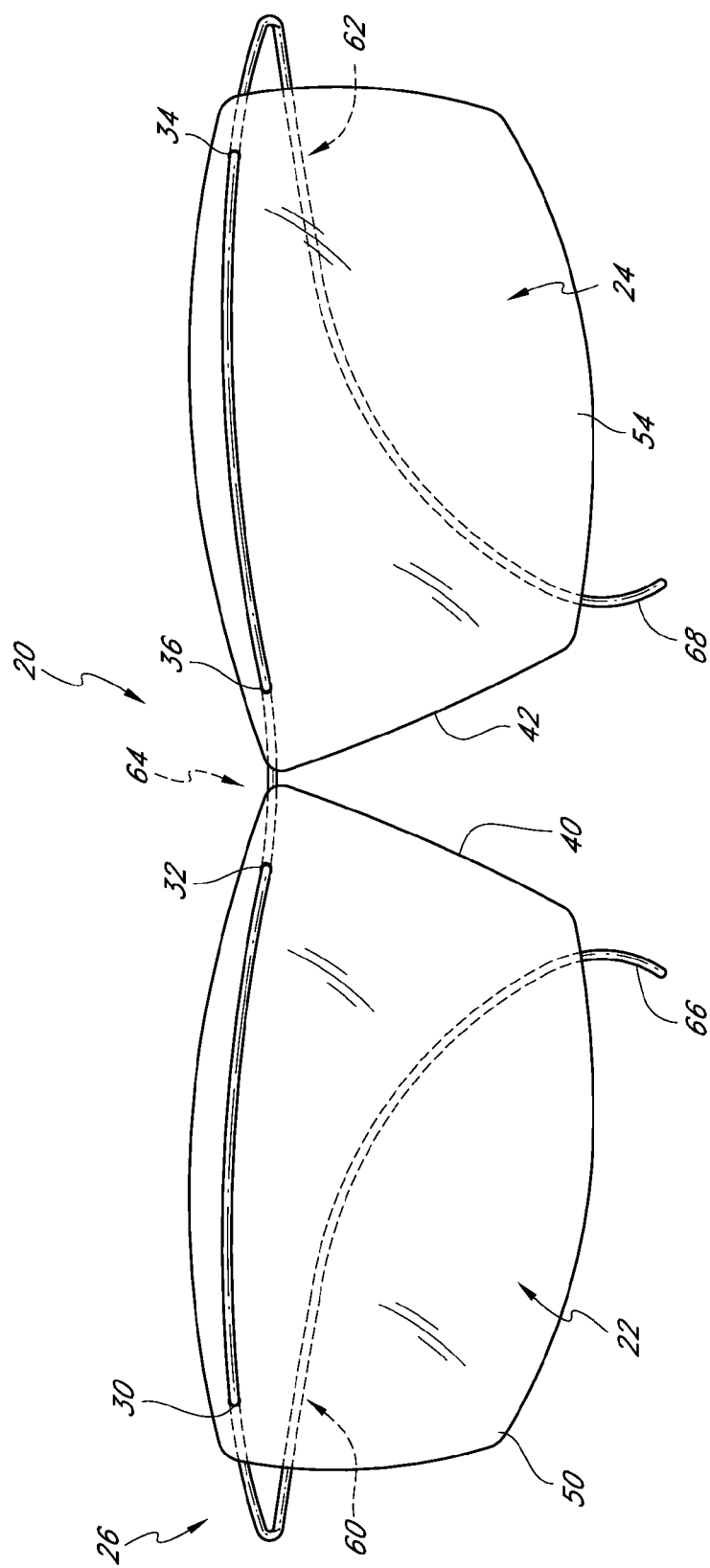
FIG. 2 is a front view of the eyewear of FIG. 1.
Figure 3:
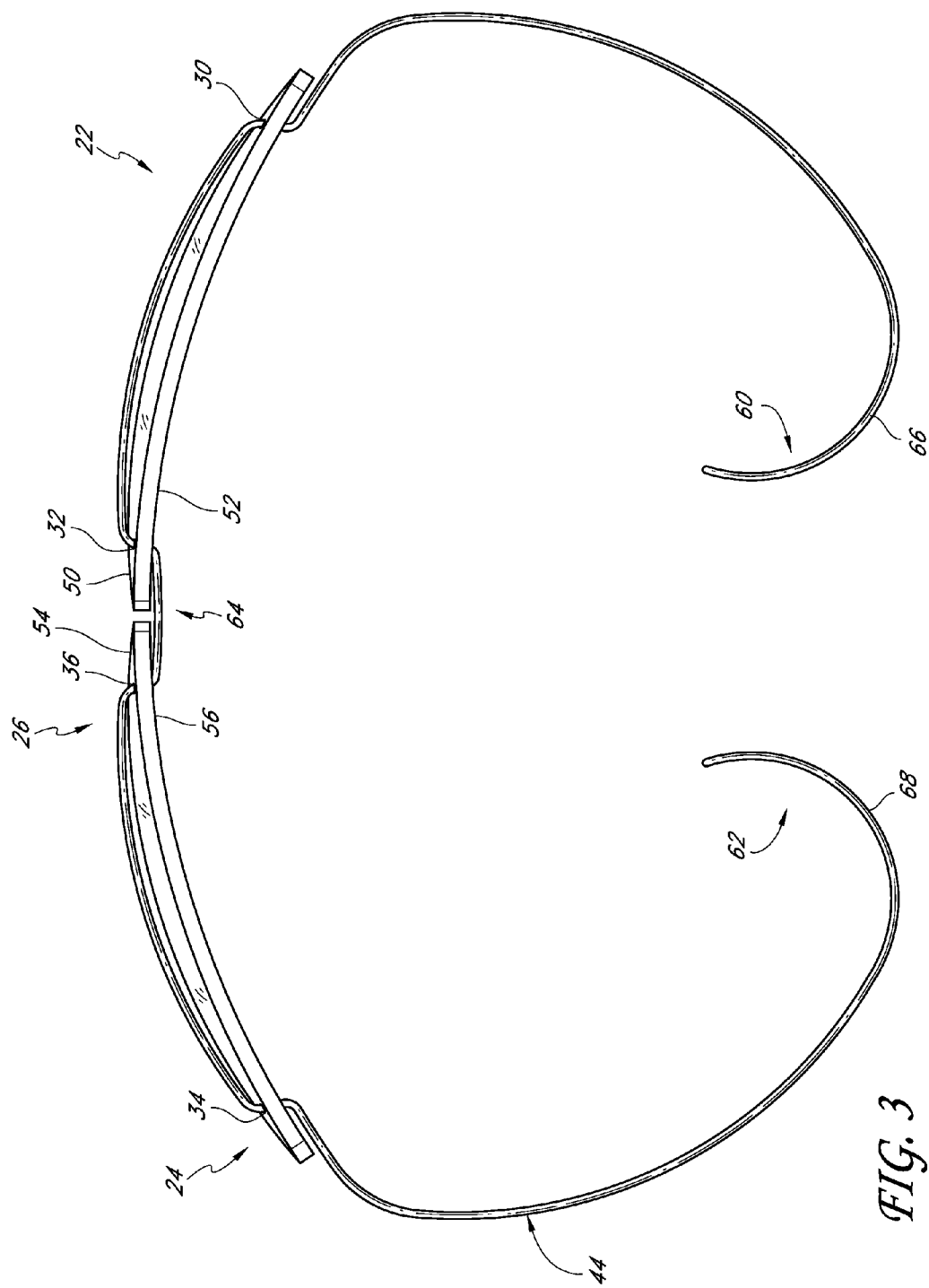
FIG. 3 is a top view of the eyewear of FIG. 1.

With reference still to FIGS. 1-3, the wire 44 used to form the frame 26 preferably has a one-piece configuration. In some embodiments, however, the length of the wire 44 can be formed by portions or sections such that a middle portion 64 is threaded through both lenses 22, 24 and two end portions 60, 62 are joined to the middle portion 64 in any suitable manner such that the two end portions 60, 62 can form temples. In such an embodiment, the end portions 60, 62 of the wire can be of a different material, shape and/or construction. The end portions 60, 62 can be secured to the middle portion 64 by a mechanical fastener, a hinge, or any other suitable technique.

With reference to FIG. 3, the first lens 22 comprises a forward facing surface 50 and a rearward facing surface 52 and the second lens 24 comprises a forward facing surface 54 and a rearward facing surface 56. The first end 60 of the wire 44 approaches the rearward facing surface 52 of the first lens 22 near the temple-side first hole 30. The wire 44 passes from rear to front through the first hole 30 and then the wire 44 passes along the forward facing surface 50 of the first lens 22 until it reaches the nasal side second hole 32 through the first lens 22. The wire 44 passes through the second hole 32 from front to rear such that the central portion 64 of the wire can span a gap between the first lens 22 and the second lens 24 at a location rearward of the first lens 22 and the second lens 24. The wire 44 passes through the nasal side second hole 36 of the second lens 24 from rear to front and then passes along the forward facing surface 54 of the second lens 24. From the forward facing surface 54, the wire 44 passes from front to rear through the temple side hole 34 of the second lens 24. The second end 62 of the wire 44 and the first end 60 of the wire, in the illustrated configuration, form a second temple tip 68 and a first temple tip 66 respectively. Advantageously, the wire 44 in the illustrated configuration extends rearward toward a temple region of a wearer from alongside the rearward surfaces 52, 56 of the first and second lenses 22, 24. Moreover, in the illustrated configuration, the central portion 64 of the wire 44 is positioned rearward of the rearward surfaces 52, 56 of the first and second lenses 22, 24.

Figure 5:
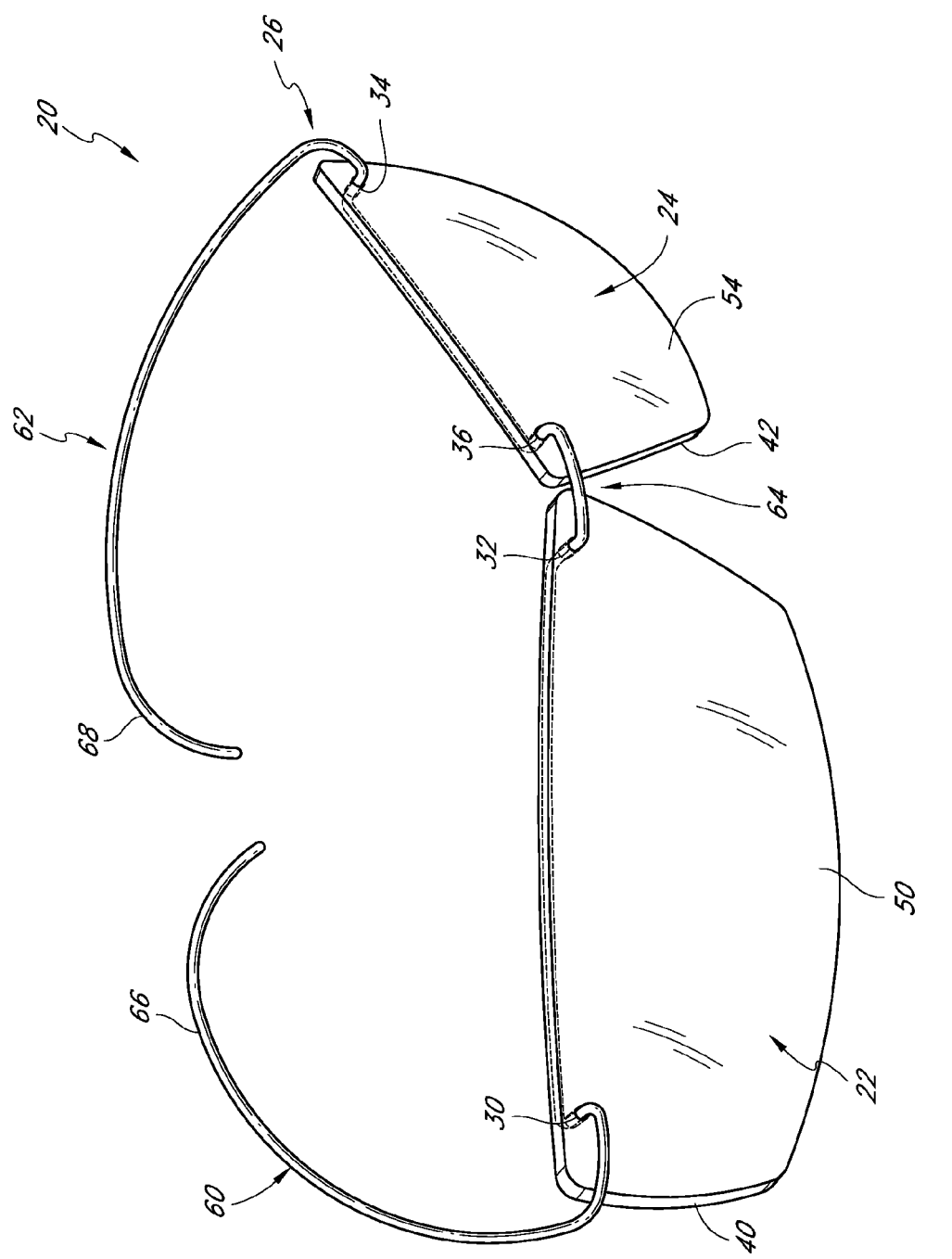
FIG. 5 is a perspective view showing eyewear that is arranged and configured in accordance with certain features, aspects and advantages of another embodiment of the present invention.

FIG. 5 illustrates another manner of threading the wire 44 through the lenses 22, 24. As shown, the first end of the wire 44 approaches the forward facing surface 50 of the first lens 22 near the temple-side first hole 30. The wire 44 passes from front to rear through the first hole 30 and then the wire 44 passes along the rearward facing surface 52 of the first lens 22 until it reaches the nasal side second hole 32 through the first lens 22. The wire 44 passes through the second hole 32 from rear to front such that the central portion 64 of the wire can span a gap between the first lens 22 and the second lens 24 at a location forward of the first lens 22 and the second lens 24. The wire 44 passes through the nasal side second hole 36 of the second lens 24 from front to rear and then passes along the rearward facing surface 56 of the second lens 24. From the rearward facing surface 54, the wire 44 passes from rear to front through the temple side hole 34 of the second lens 24. The second end 62 of the wire 44 and the first end 60 of the wire, in the illustrated configuration, form the second temple tip 68 and the first temple tip 66 respectively.

In the configurations of FIGS. 1-5, the wire 44 bends back toward the temple tips 66, 68 from the same side of the lenses 22, 24 as the wire 44 spans the nasal gap between the lenses 22, 24. In other words, when two holes 30, 32, 34, 36 are used on two lenses 22, 24 in the configurations shown in FIGS. 1-5, the wire 44 spans the gap between the lenses 22, 24 on the same side (e.g., forward facing in FIG. 5 and rearward facing in FIGS. 1-4) of the lenses 22, 24 as the wire 44 exits from the lenses and turns toward the temple tips 66, 68.

More than two holes can be used on the lenses and the wire can be threaded accordingly. The arrangements illustrated in FIGS. 1-5, however, are advantageously easy to manufacture when compared with arrangements comprising more than two holes per lens and the arrangements illustrated in FIG. 1-4 are believed to be sufficiently reliable and strong such that additional holes are not a significant enough improvement in function to warrant the additional manufacturing complexities. Nevertheless, as set forth above, more than two holes can be used and can provide differing and unique appearances.

Figure 6:
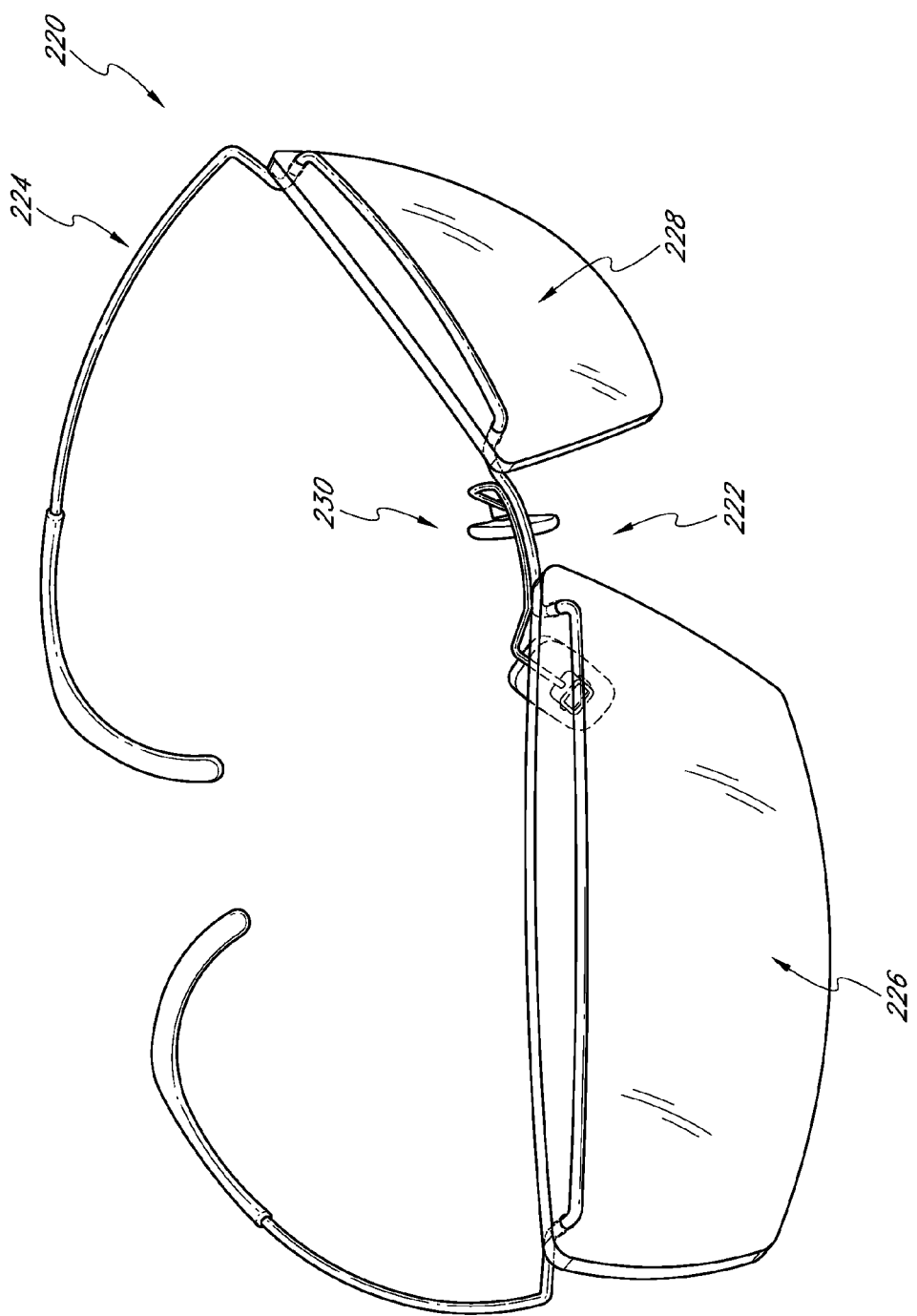
FIG. 6 is a perspective view showing eyewear that is arranged and configured in accordance with certain features, aspects and advantages of another embodiment of the present invention.
Figure 7:
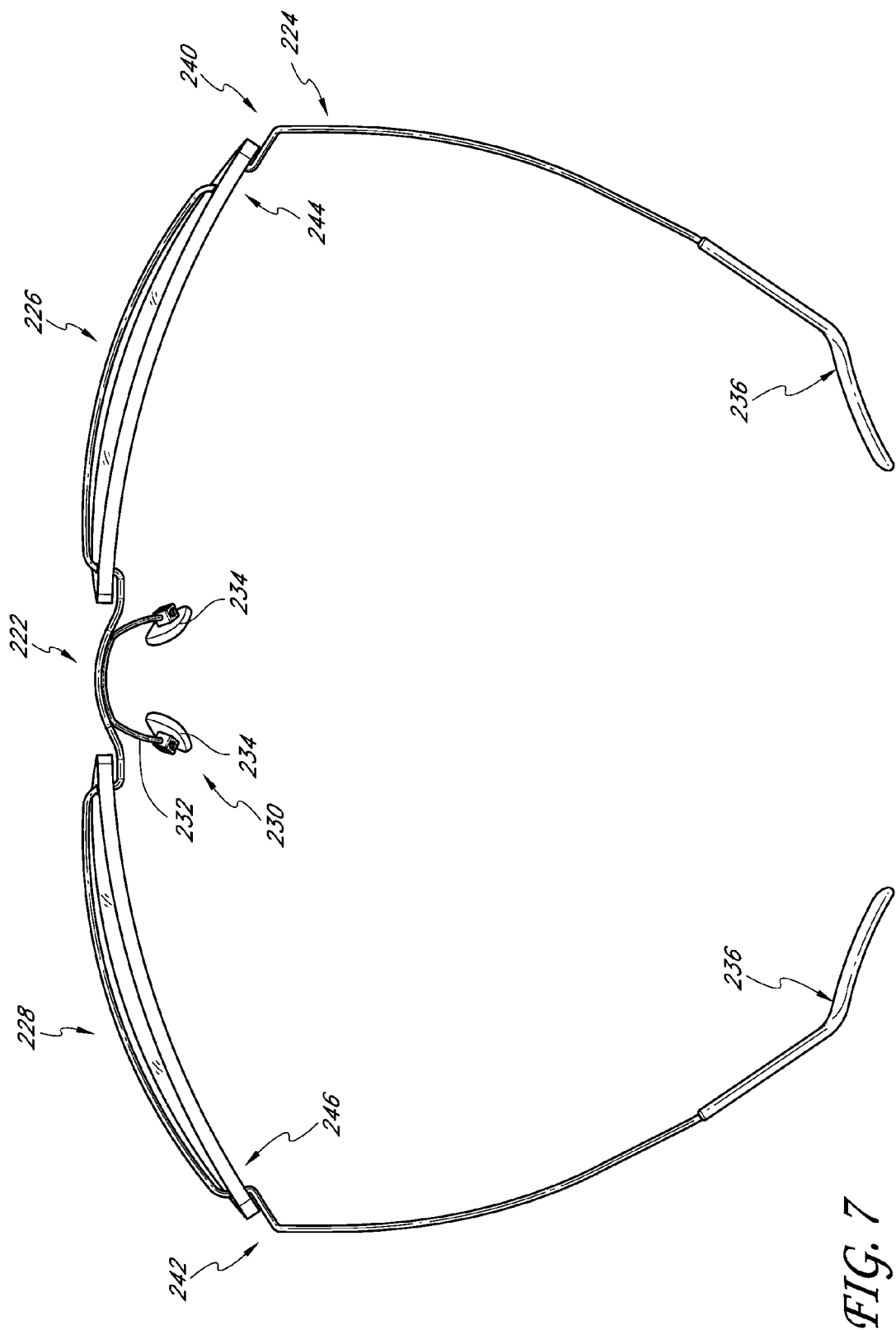
FIG. 7 is a top view of the eyewear of FIG. 6.
Figure 8:
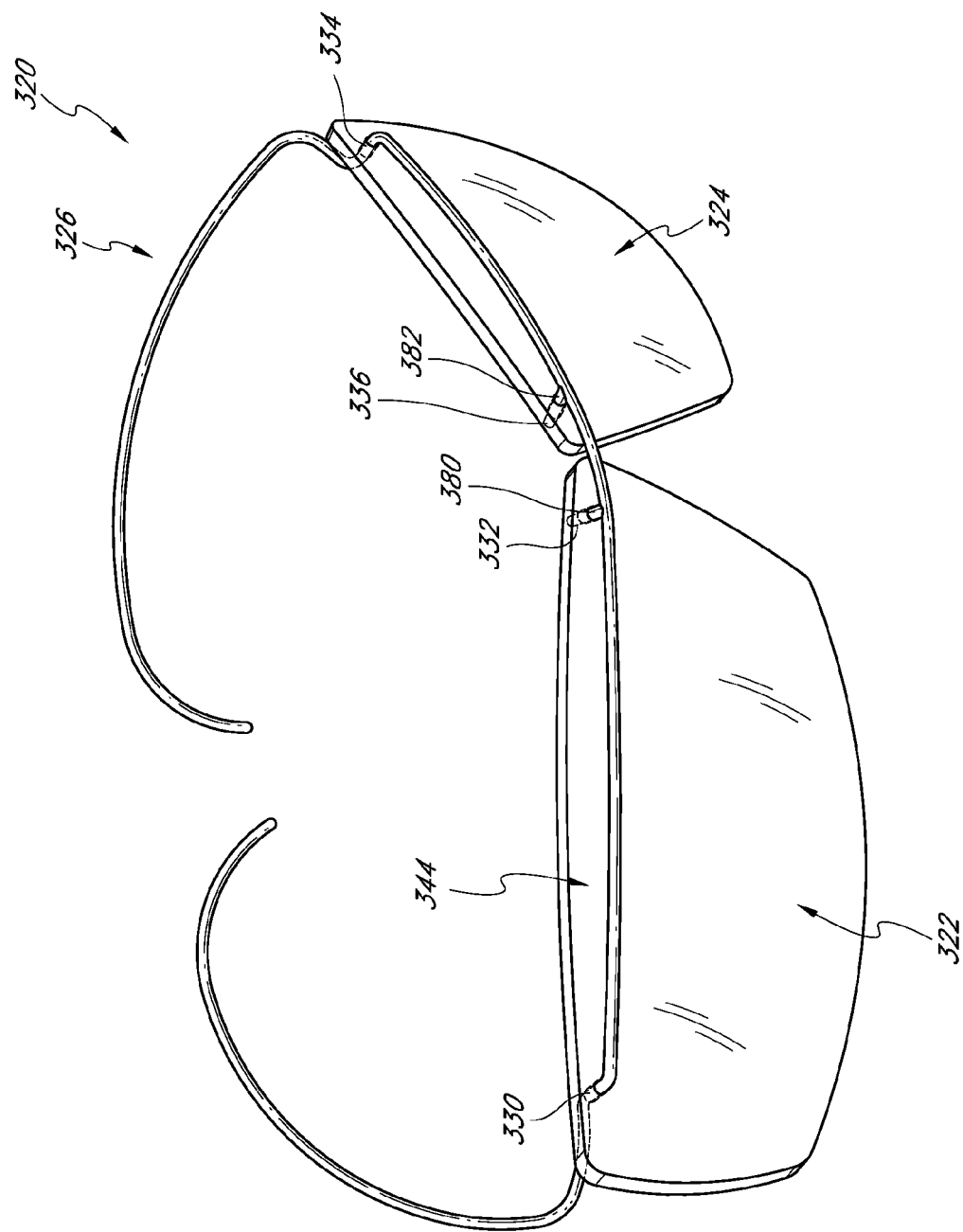
FIG. 8 is a perspective view showing eyewear that is arranged and configured in accordance with certain features, aspects and advantages of another embodiment of the present invention.
Figure 9:
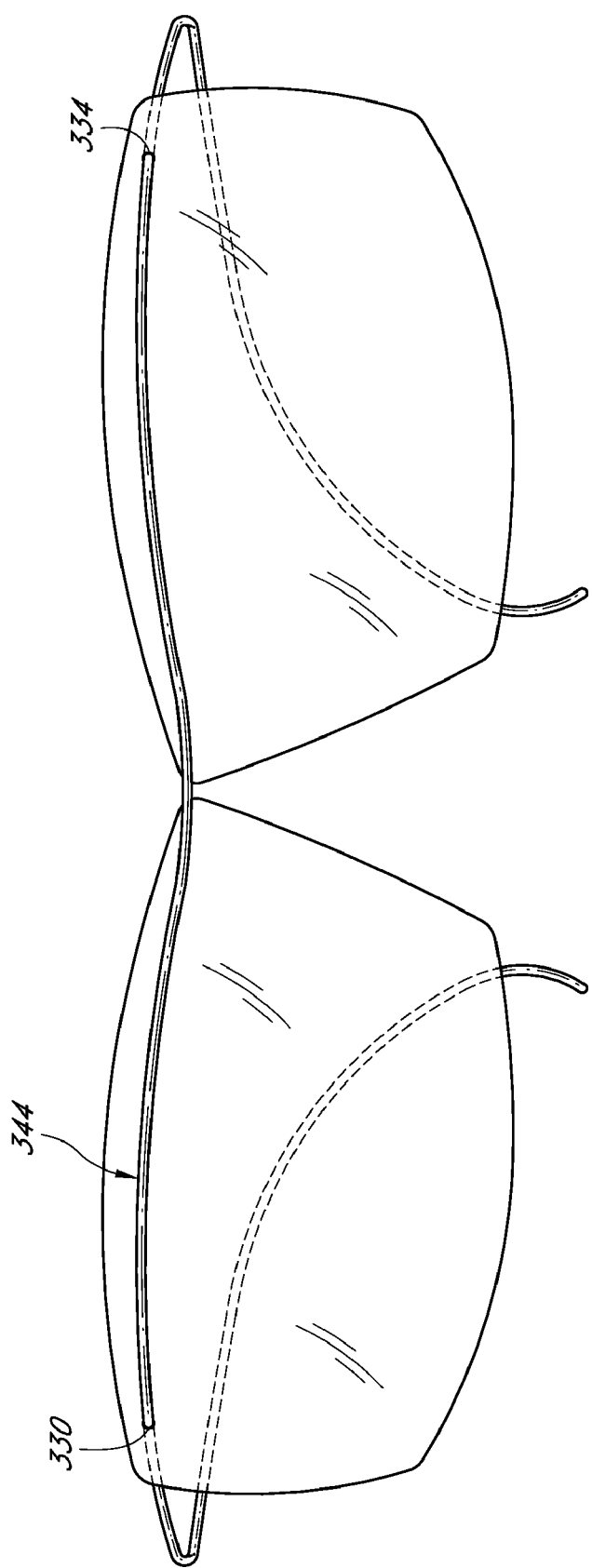
FIG. 9 is a front view of the eyewear of FIG. 8.
Figure 10:
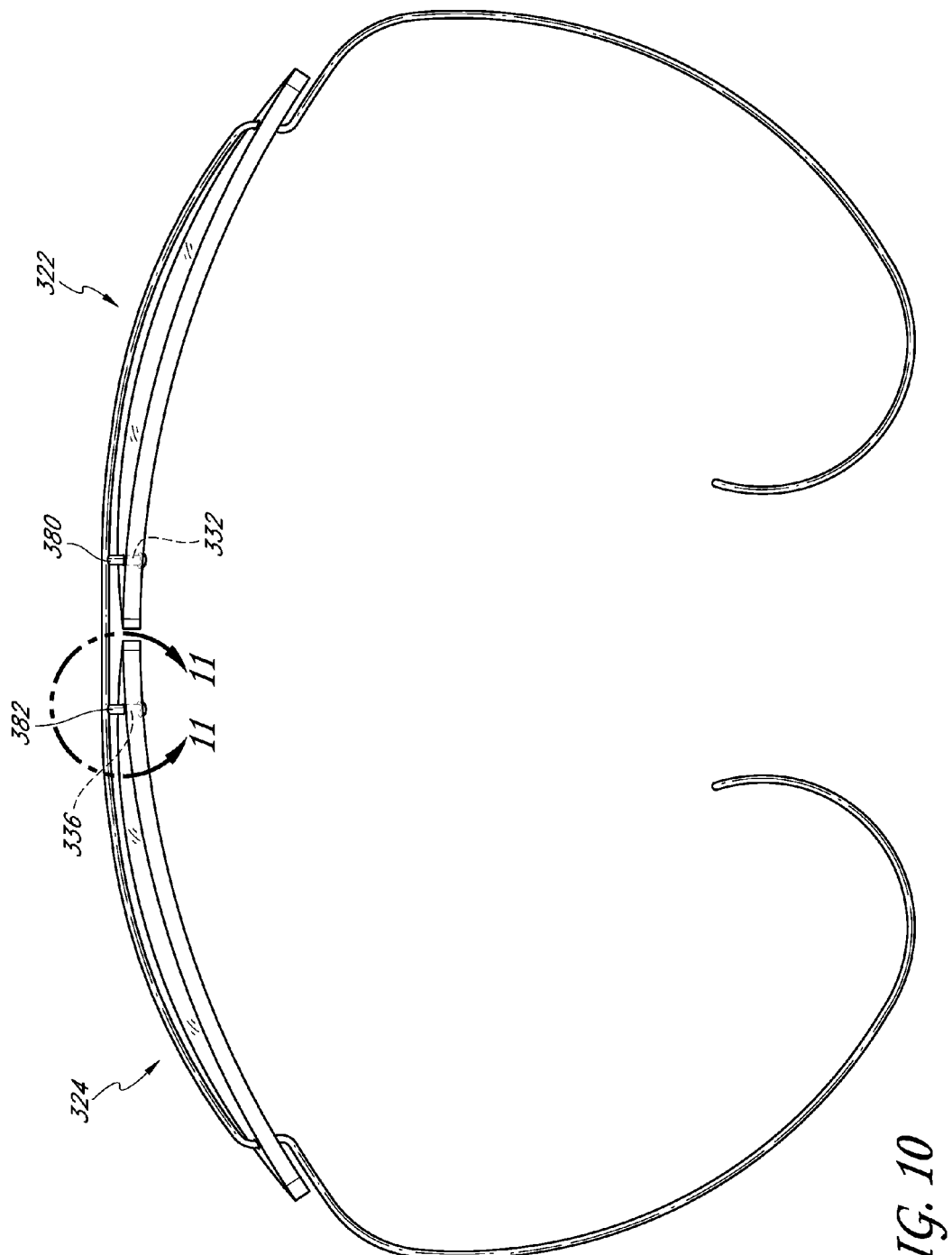
FIG. 10 is a top view of the eyewear of FIG. 8.

FIGS. 6 and 7 illustrate another embodiment of eyewear 220 that is arranged and configured in accordance with certain features, aspects and advantages of the present invention. The eyewear 220 is similar in many respects to the eyewear 20 shown in FIGS. 1-5. Four main variations from the eyewear 20 shown in FIGS. 1-5 will be explained in more detail.

The eyewear 220 shown in FIG. 6 features an elongated central portion 222 of a wire 224. The central portion 222 in the embodiment shown in FIG. 6 is elongated such that an enlarged spacing between a first lens 226 and a second lens 228 results. Attached to the elongated central portion 222 of the wire 224 is a nose pad mounting structure 230.

With reference to FIG. 7, the illustrated nose pad mounting structure 230 comprises a central member 232 that is generally u-shaped in configuration. The central member 232 can be secured to the central portion 222 of the wire 224 in any suitable manner. In one embodiment, the central member 232 has a portion that is welded, brazed or soldered to the central portion 222 of the wire 224. In some embodiments, the mounting structure 230 can be secured directly to the lenses.

The central member 232 supports nose pads 234 in any suitable manner. The nose pads 234 can be formed of plastic, metal or any other suitable material. In some configurations, holes can be formed near the nasal area of each lens and a nose pad can be attached to the lenses through press-fitting, threaded fasteners, compression mounting or any other suitable technique.

The eyewear 220 shown in FIG. 6 also comprises temple tips 236. The temple tips 236 can be plastic or metal temple tips and can be added to the ends of the wire 224 for comfort. Each of the temple tips 236 may be constructed as a sleeve into which an end of the wire 224 is inserted. The temple tips 236 also may use a snap-on construction that is secured by press-fit or the like. In some configurations, the temple tips 236 may be secured by pressure, glue, adhesives, soldering, welding or any other suitable technique.

With reference to FIG. 7, the illustrated wire 224 can comprise a sharp bend 240, 242 proximate temple portions 244, 246 of the first and second lenses 226, 228. The sharp bends 240, 242 allow the wire 224 to extend away from the lenses 226, 228 in a direction generally parallel to the lenses 226, 228, which provides a more secure connection and orientation between the wire 224 and the lenses 226, 228. Other configurations also are possible.

With reference now to FIGS. 8-16, other eyewear embodiments are shown therein that feature a partially threaded frame construction. FIGS. 8-11 show eyewear 320 arranged and configured in accordance with certain features, aspects and advantages of an embodiment the present invention. The eyewear 320 shown in FIGS. 8-11 differs from the eyewear 20 of FIGS. 1-3 in that, for example, a frame 326 that supports a first lens 322 and a second lens 324 is threaded through only a first hole 330 in the first lens 322 and a first hole 334 in the second lens 324 while the frame 326 is coupled to second holes 332, 336 of the lenses 322, 324 through pins or other suitable mechanical couplers. Thus, in the embodiment of FIGS. 8-11, the frame 326 comprises a wire 344 that extends through the lenses 322, 324, along a surface of the lenses 322, 324, and joins the two lenses 322, 324 together. In addition, a central portion 364 of the wire 344 comprises pins 380, 382 or other members that extend into the holes 332, 336 such that the lenses 322, 324 can have an easily fixed orientation relative to the frame 326. In this regard, increased spacing between the holes 330, 332 of the first lens 322 and the holes 334, 336 of the second lens 324 can enhance the accuracy to which an angular orientation can be fixed.

Figure 11:
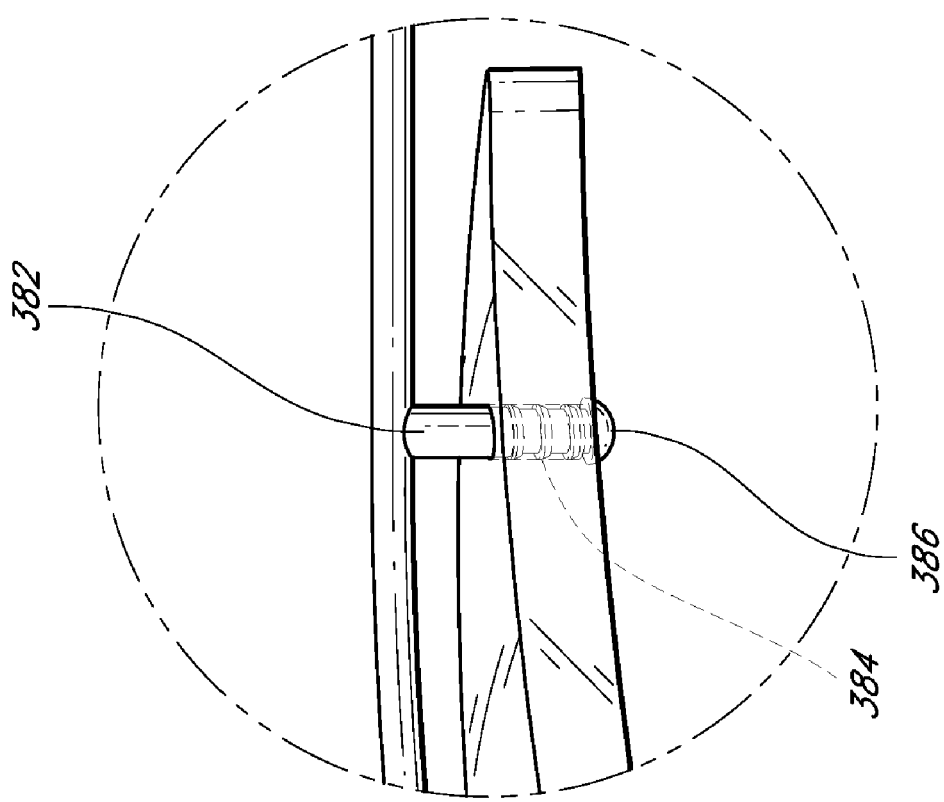
FIG. 11 is an enlarged top view of a portion of the eyewear taken along the line 11-11 in FIG. 10.

With reference now to FIG. 11, the pins 380, 382 will be described in further detail. In one configuration, the pins 380, 382 comprise ridges or barbs 384. The barbs 384 can either be secured within the corresponding hole 332, 336 or can be captured within a nut 386 or the like. When the pin 380, 382 is inserted into the nut 386, the two members are secured together, which locks the pin 380, 382 into position within the hole 332, 336. In some configurations, a threaded post can be used and a threaded nut can be used however, because threaded components tend to loosen over time, such a configuration is less desired. Nevertheless, because the post, which would include the threaded, is mounted to the generally rigid wire 344, there is less movement experienced between the wire 344 and the lenses 322, 324, which reduces the likelihood that the threaded nut would loosen relative to the pin 380, 382. Other configurations also are possible.

Figure 12:
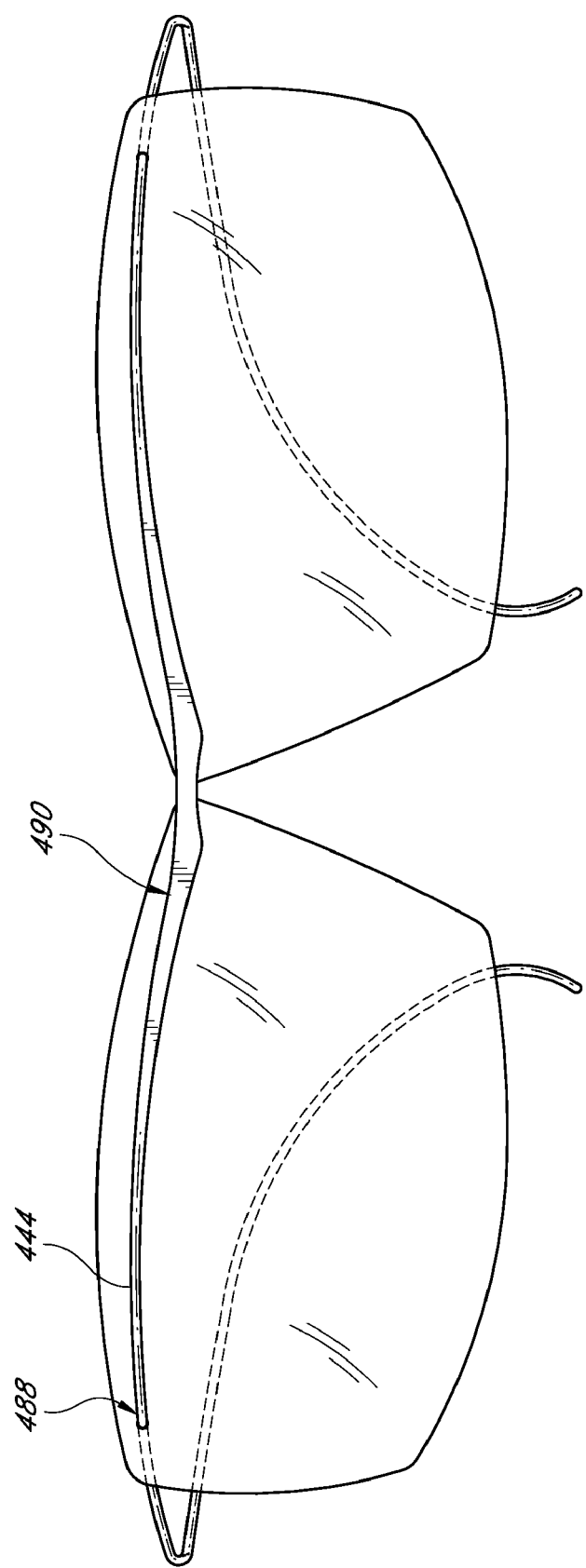
FIG. 12 is front view showing eyewear that is arranged and configured in accordance with certain features, aspects and advantages of another embodiment of the present invention.
Figure 13:
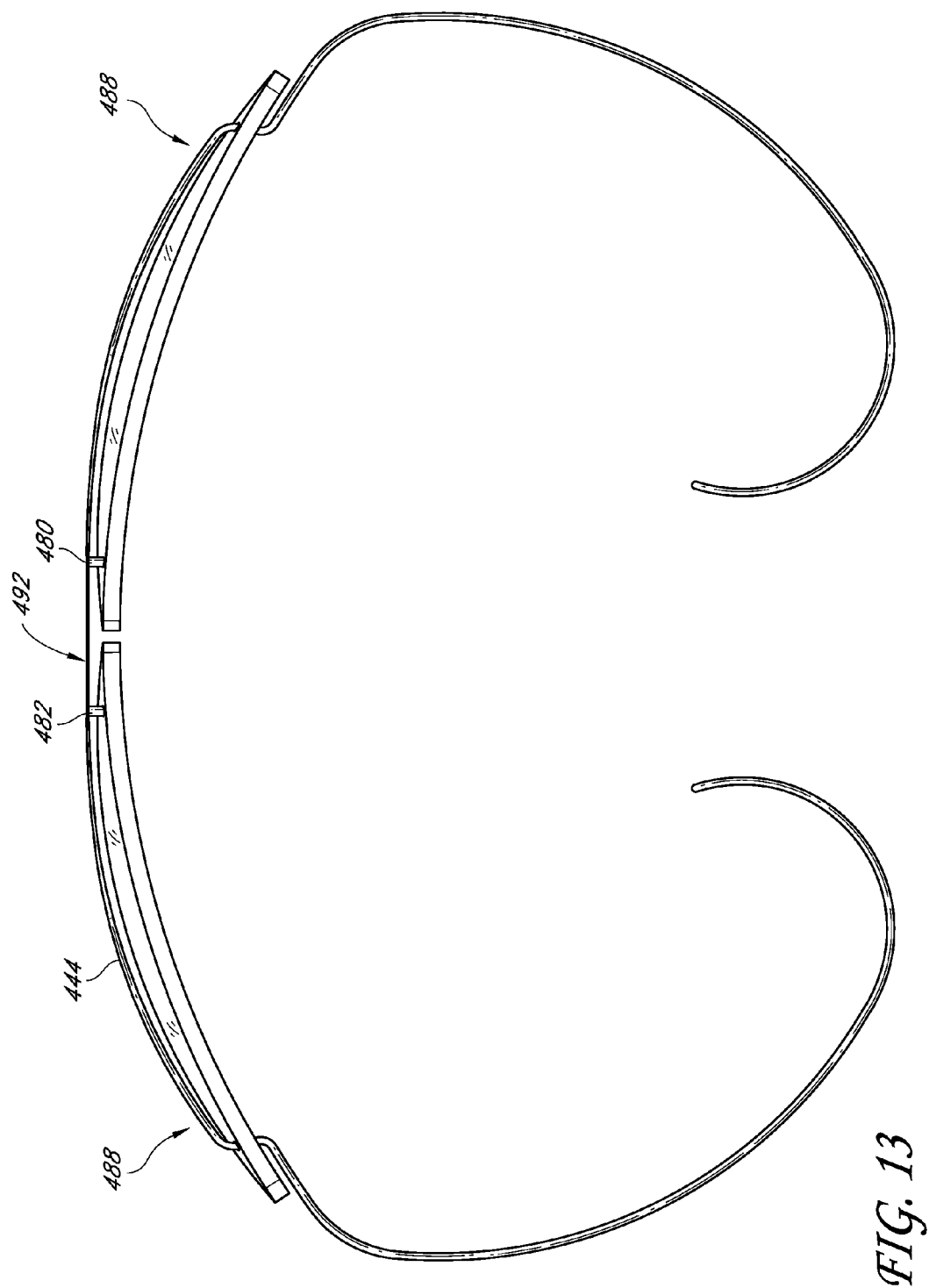
FIG. 13 is a top view of the eyewear of FIG. 12.

With reference to FIGS. 12 and 13, a partially threaded (i.e. the wire being threaded through holes) configuration is shown in which a wire 444 has a non-uniform cross-section. The wire 444 has a generally round cross-section in a region 488 in which the wire 444 is threaded through the lens and has a generally flattened cross-section in another region 490 that is not threaded through the lens. Thus, the pins 480, 482 can be more easily secured to the wire 444. In some configurations, rather than pins, small threaded fasteners can extend through holes in the wire 444. Other configurations also can be used to secure the wire 444 to the lenses 422, 424.

While the configurations shown in FIGS. 8-13 comprise pins or the like in a nasal-portion position, it is possible for the wire to thread through the nasal-portion position and for the pins to be positioned on the temple-portion position. In addition, it is possible to use a configuration featuring a wire threaded through one or more lenses in at least two locations with pins being used in other locations. Preferably, however, the wire extends through each lens in at least one location. More preferably, to provide a stronger assembly, the wire extends through the temple-side portions of the lenses in embodiments with pins or the like such that the pins or the like can be positioned in between the regions through which the wire passes.

Figure 14:
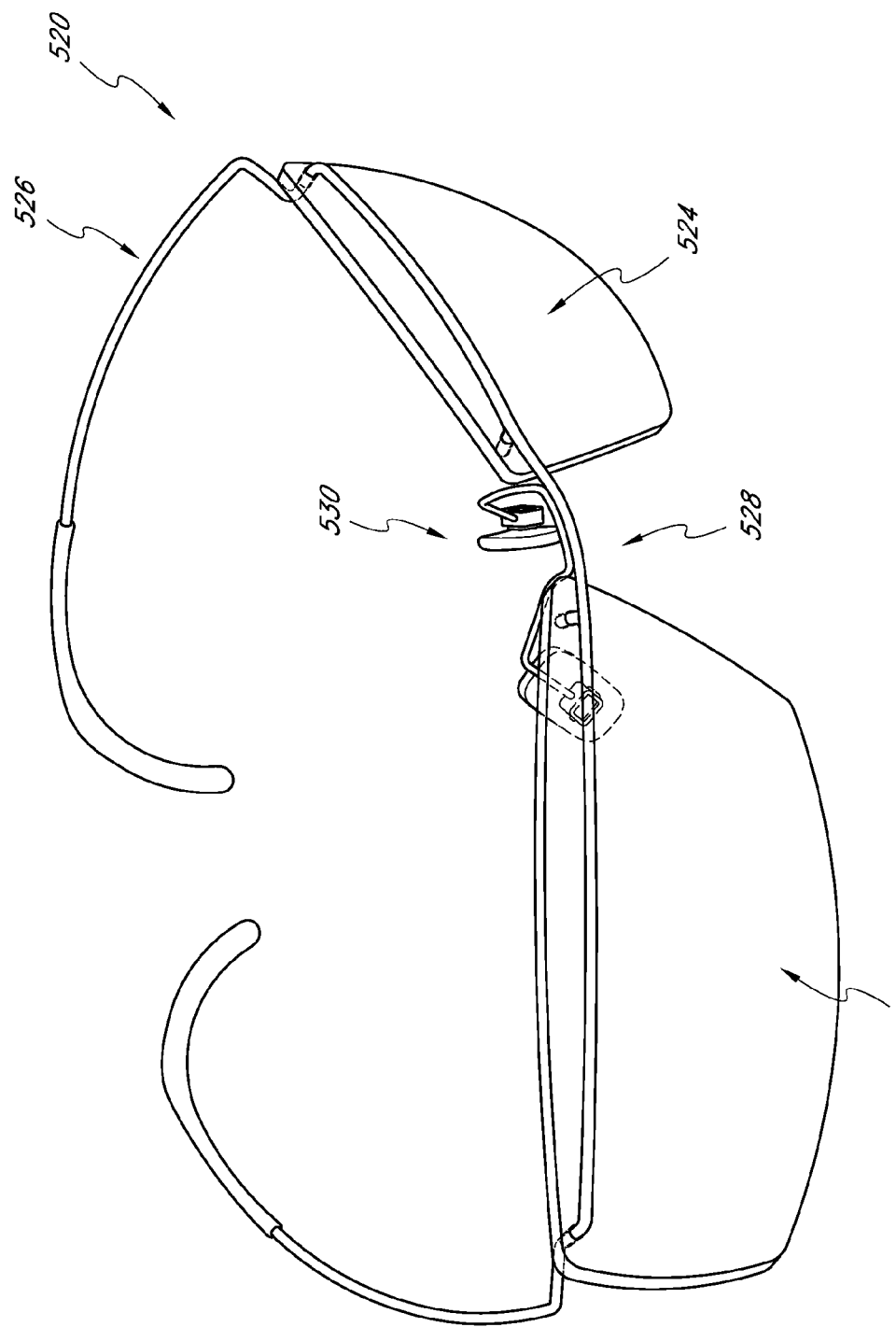
FIG. 14 is a perspective view showing eyewear that is arranged and configured in accordance with certain features, aspects and advantages of another embodiment of the present invention.
Figure 15:
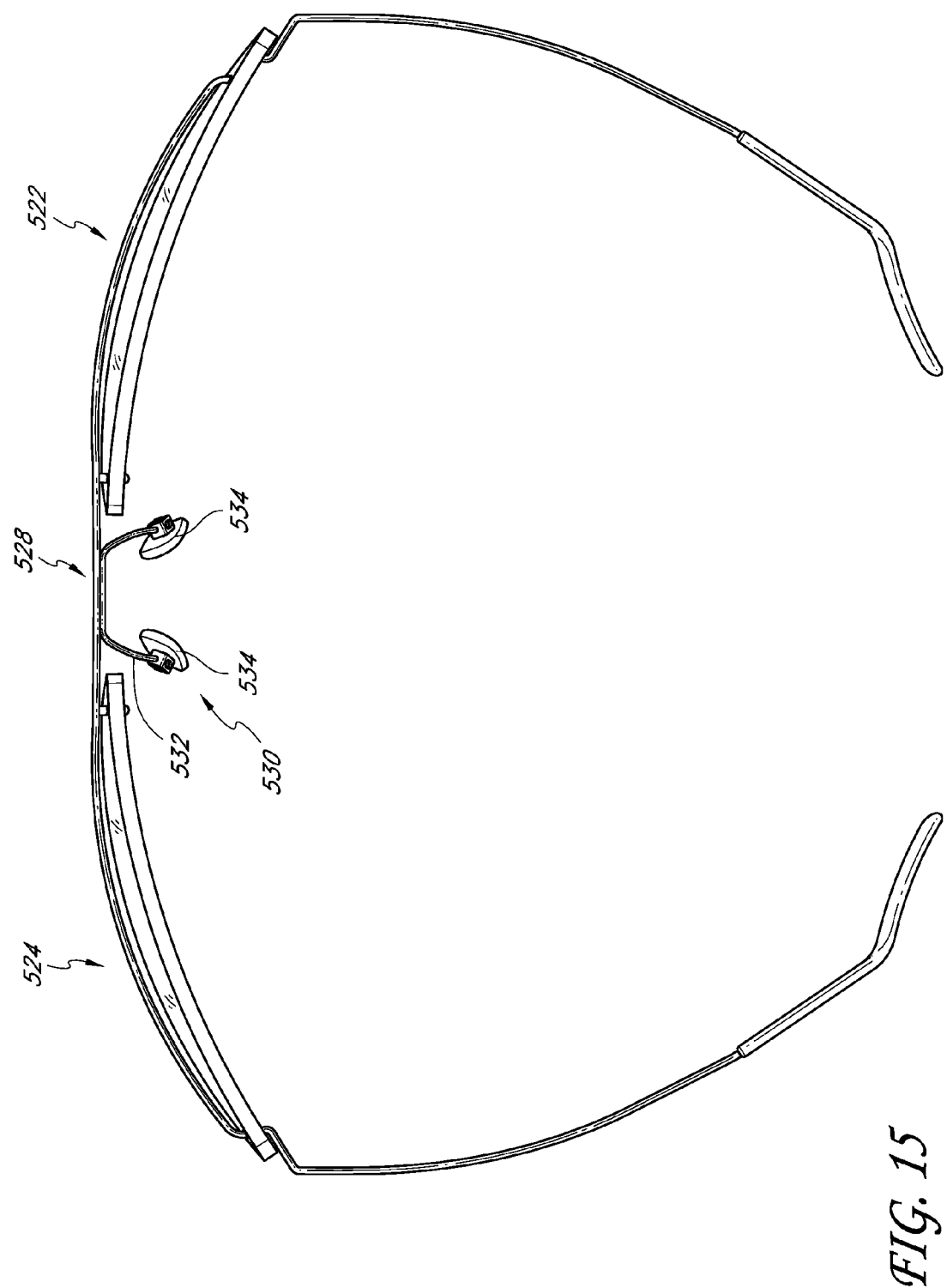
FIG. 15 is a top view of the eyewear of FIG. 14.

With reference now to FIG. 14, an eyewear assembly 520 is shown featuring a first lens 522, a second lens 524 and a frame 526. The frame 526 can be similar to the frames shown in FIGS. 8-13 in that it includes pins or the like. In addition, the frame 526 includes an enlarged central portion 528 that is positioned generally between the two lenses 522, 524.

The enlarged central portion 528 can be used for mounting a nose pad mounting structure 530 comprises a central member 532 that is generally u-shaped in configuration. The central member 532 can be secured to the central portion 528 of the wire 526 in any suitable manner. In one embodiment, the central member 532 has a portion that is welded, brazed or soldered to the central portion 528 of the wire 526. In some embodiments, the mounting structure 530 can be secured directly to the lenses. The central member 532 supports nose pads 534 in any suitable manner. The nose pads 534 can be formed of plastic, metal or any other suitable material.

Figure 16:
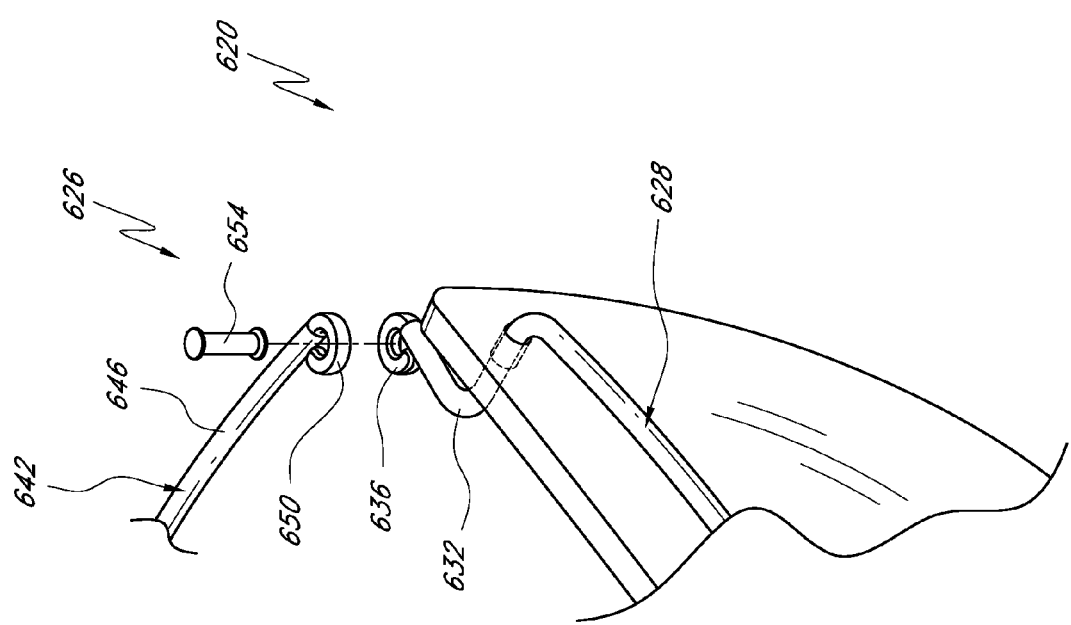
FIG. 16 is an enlarged exploded perspective view showing eyewear that is arranged and configured in accordance with certain features, aspects and advantages of another embodiment of the present invention.

With reference now to FIG. 16, a portion of eyewear 620 is shown therein. The frame 626 comprises a first portion 628 that connects the lenses as discussed above. The first portion 628 comprises a first end (not shown) and a second end 632. Each of the ends 632 can be formed in a loop 636, for example.

The frame 626 in the illustrated configuration also comprises separate temple members 642. The temple members 642 can have any suitable configuration and, in one embodiment, each of the temple members can have an end 646 that terminates in a loop 650. The loops 636, 650 can be joined together in any suitable manner. In one embodiment, a mechanical fastener 654 can be used to secure the loops 636, 650 together. In the illustrated embodiment, the mechanical fasteners 654 comprise rivets but any other suitable mechanical fastener can be used to complete the frame 626. In other embodiments, the frame 626 can comprise hinges or the like to allow the temple members 642 to fold relative to the first portion 628. Any other suitable technique for folding the portions of the frame not connecting the lenses also can be used.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For example, certain features of the present invention can be used with a single lens, such as a shield-style lens. It is also contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. It also should be understood that various features and aspects of the embodiments disclosed in the applications incorporated by reference above can be combined with or substituted for one another in order to form varying eyewear configurations. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. Eyewear comprising a first lens, a second lens and a single piece frame connecting the first lens to the second lens, the first and second lenses being generally rigid, the single piece frame comprising a wire that defines a first temple piece, a second temple piece, and a bridge, the first lens comprising a first hole and a second hole spaced apart in a first lens width direction, the second lens comprising a third hole and a fourth hole spaced apart in a second lens width direction, and the wire extending through the first hole and the second hole of the first lens and the third hole and the fourth hole of the second lens.

2. The eyewear of claim 1, wherein the first hole of the first lens is positioned proximate a temple side of the first lens and the fourth hole of the second lens is positioned proximate a temple side of the second lens.

3. The eyewear of claim 2, wherein the second hole of the first lens is positioned proximate a nasal side of the first lens and the third hole of the second lens is positioned proximate a nasal side of the second lens.

4. The eyewear of claim 1, wherein the first hole and the second hole of the first lens are spaced apart by at least half of a full lens width of the first lens.

5. The eyewear of claim 1, wherein at least the first and fourth holes comprise a fully closed shape and positioned inside of an outer peripheral surface of the first and second lenses respectively.

6. The eyewear of claim 1, wherein the first lens comprises a forward facing surface and at least a portion of the wire extends along the forward facing surface between the first and second holes.

7. The eyewear of claim 1, wherein the first lens comprises a rearward facing surface and at least a portion of the wire extends along the rearward facing surface between the first and second holes.

8. The eyewear of claim 1, wherein at least a portion of the wire has a cylindrical cross-section.

9. The eyewear of claim 1, wherein at least a portion of the wire has a non-cylindrical cross-section.

10. The eyewear of claim 9, wherein the portion of the wire with the non-cylindrical cross-section extends in a lens width direction along at least a portion of the first lens.

11. The eyewear of claim 1, wherein a first portion of the wire extends rearward from the first lens and a second portion of the wire extends rearward from the second lens, the first portion of the wire defining the first temple piece and the second portion of the wire defining the second temple piece.

12. The eyewear of claim 1, wherein a first portion of the wire extends rearward from the first lens and a second portion of the wire extends rearward from the second lens, the first portion of the wire being connected to a first temple tip and the second portion of the wire being connected to a second temple tip.

13. The eyewear of claim 1, wherein a first portion of the wire extends away from the first lens in a temple region of the first lens and a second portion of the wire extends away from the second lens in a temple region of the second lens.

14. The eyewear of claim 1 further comprising a nose pad mounting structure that is secured to one or more of the first lens, the second lens and the wire.

15. The eyewear of claim 14, wherein the nose pad mounting structure is secured to a portion of the wire that spans between the first lens and the second lens.

* * * * *

UNITED STATES PATENT AND TRADEMARK OFFICE
CERTIFICATE OF CORRECTION

| | | |
|---|---|---|
| PATENT NO. | : 7,963,650 B2 | Page 1 of 1 |
| APPLICATION NO. | : 12/701091 | |
| DATED | : June 21, 2011 | |
| INVENTOR(S) | : Gabriel Matheus Maria Barlag, Marcellinus Gerardus Maria Barlag and Ira S. Lerner | |

It is certified that error appears in the above-identified patent and that said Letters Patent is hereby corrected as shown below:

On the Title Page, (Item 75) Inventors, please delete "Marina Del Ray" and insert therefore,
--Marina Del Rey--

Signed and Sealed this
Twenty-eighth Day of February, 2012

David J. Kappos
*Director of the United States Patent and Trademark Office*